Figure 1:
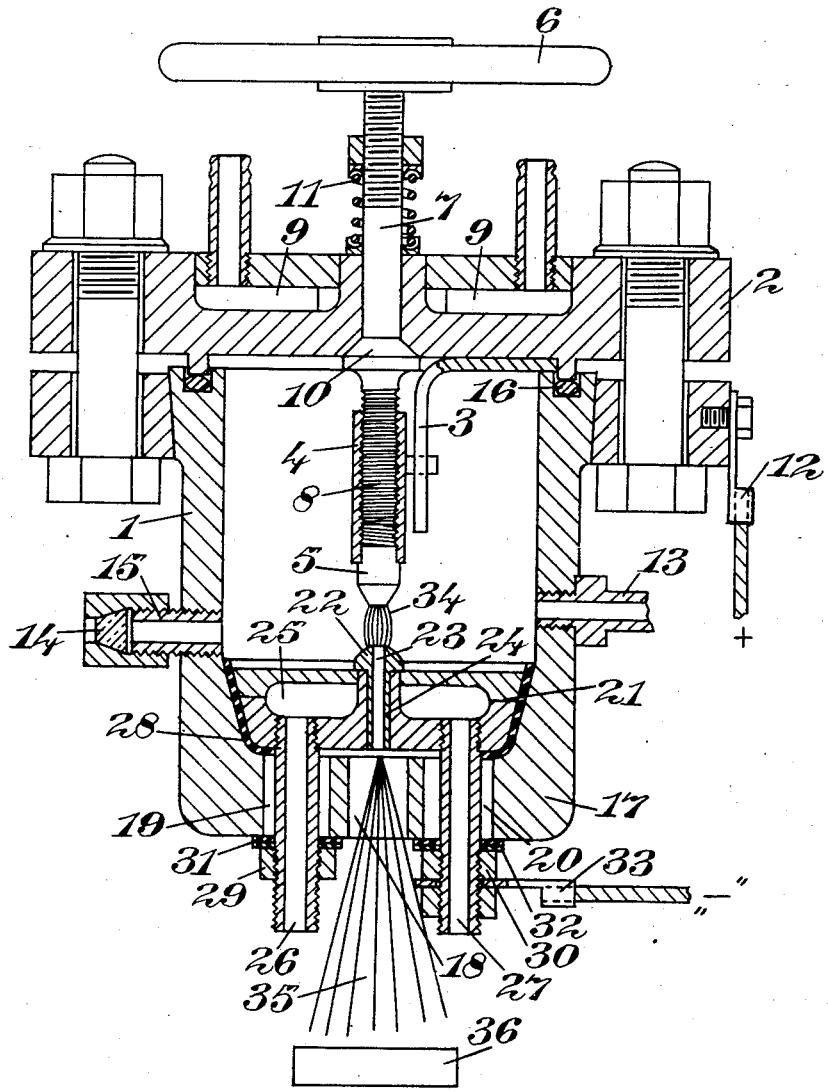

May 9, 1939.   R. REINECKE ET AL   2,157,498
APPARATUS FOR THE PRODUCTION OF METALLIC COATINGS
Filed Jan. 25, 1937   3 Sheets-Sheet 1

R. Reinecke &
W. Burkhardt
Inventors
By: Glascock Downing & Seebold
Attys.

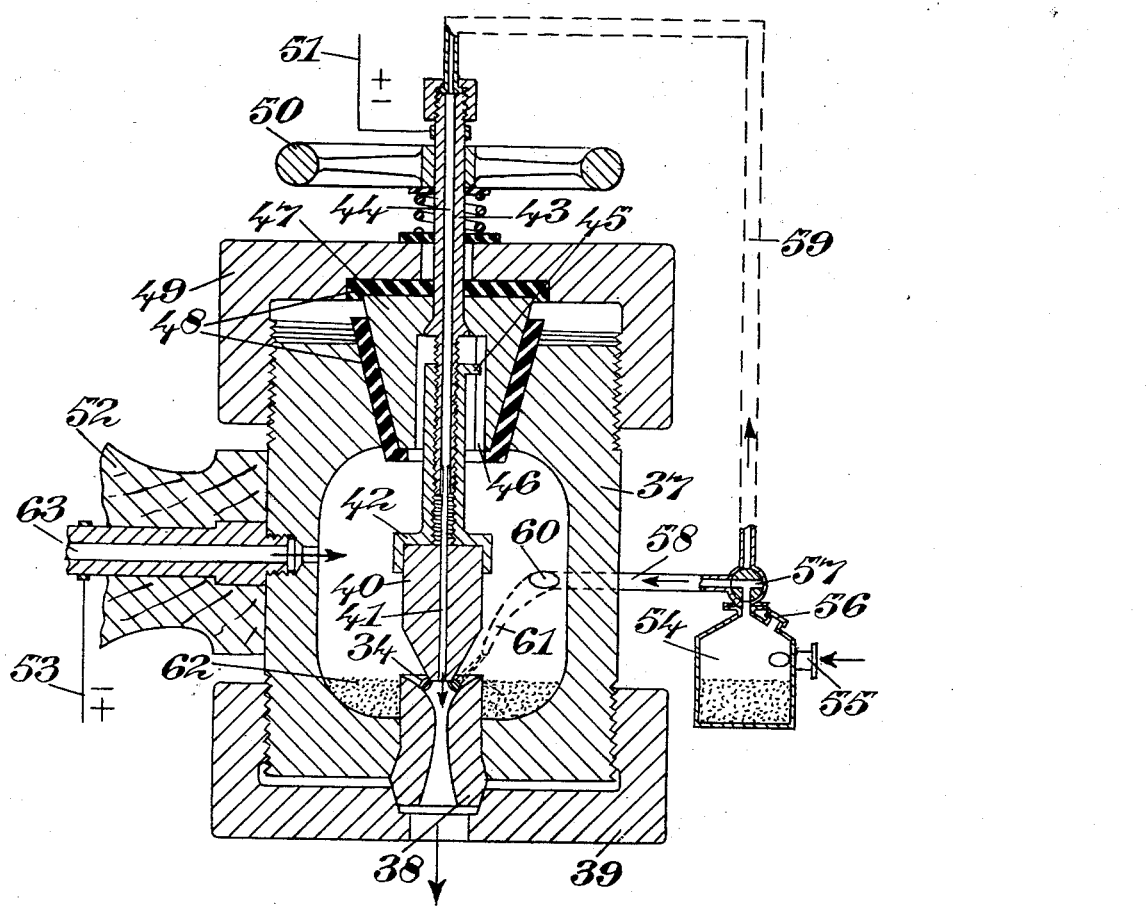

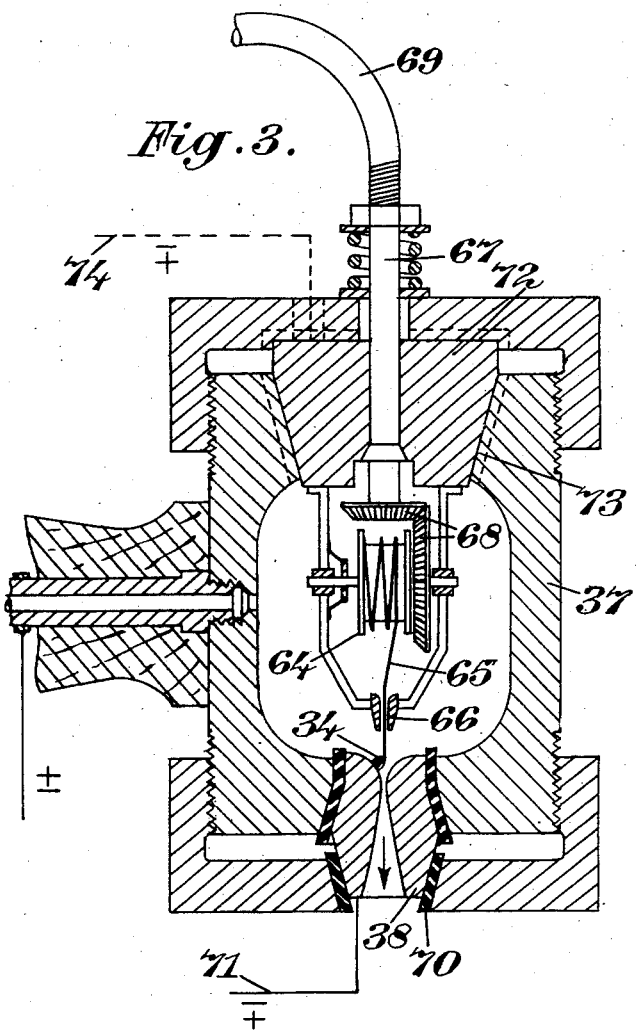

Patented May 9, 1939

2,157,498

UNITED STATES PATENT OFFICE 2,157,498

APPARATUS FOR THE PRODUCTION OF METALLIC COATINGS

Rudolf Reinecke, Berlin-Lankwitz, and Wilhelm Burkhardt, Berlin-Grunewald, Germany, assignors to Bernhard Berghaus, Berlin-Lankwitz, Germany Application January 25, 1937, Serial No. 122,328
In Germany February 1, 1936

10 Claims. (Cl. 91—12.2)

It is known to produce metallic coatings from metals vaporised in a chamber by means of an electric arc, which chamber terminates into a nozzle surrounded by a second suction nozzle which is operated by compressed air to suck off the metal vapours produced in the chamber. This known apparatus, however, is suitable only for metals which fuse at a relatively low temperature, but is not suitable for the vaporisation of metals fusing at a high temperature, such as tungsten, chromium, titanium, hafnium, molybdenum, tantalum, vanadium, zirconium and the like.

In the apparatus according to the present invention the vaporisation takes place in a pressure chamber in which an increased pressure is maintained by the supply of an auxiliary pressure means, for instance, a gas, vapour or gas and vapour mixture, and the metal, which is vaporised in the electric arc, is carried away from the pressure chamber by the auxiliary pressure means, which flows out through one or more openings, for instance a bore, in one of the electrodes. The metal to be vaporised may be introduced into the arc in a known manner. The electrodes may be constituted by carbon electrodes. In many cases it is an advantage that the metal or alloy to be vaporised constitutes one of the electrodes, for instance the positive electrode. The positive electrode may also consist of a carbon electrode with a metal core.

The electrode provided with a bore, for instance the negative one, may consist of the same metal as the positive electrode, for instance a metal fusing at a high temperature, such as tungsten. In any case, it is desirable that the bored electrode, mostly the negative one, shall fuse or vaporise, for which reason it is preferably made of hard metals, or of metal carbides which fuse at a high temperature, such as titanium carbide, zirconium carbide, hafnium carbide, niobium carbide, tantalum carbide, tungsten carbide, molybdenum carbide or also of nitrides fusing at a high temperature, such as tantalum nitride or zirconium nitride or titanium nitride. However, use may also be made of mixtures of these substances, if desired in admixture with graphite. In order to prevent the bored electrode from being heated beyond the fusing point of the electrode material, the bored electrode is cooled, for instance water cooled.

The pressure in the pressure chamber is adjusted by the regulation of the supply of the auxiliary pressure means and by a suitable choice of the size of the outlet opening in the electrode. As auxiliary pressure means use may be preferably made of gases such as hydrogen, nitrogen, helium or the like, which protect the stream of metal vapour leaving the electrode opening against oxidation by the air. However, the auxiliary pressure means may also consist wholly or partly of gases or vapours, for instance hydrocarbons such as methane, ethane, acetylene or the like, which react with the metal vapour by building highly stable metal-metalloid compounds, such as carbides. The addition of acetylene is thereby preferably so regulated that it remains below the explosion limits.

A further feature of the invention is, that the metal or alloy which is to be fused or vaporised, is supplied to the electric arc burning in the pressure chamber, in the form of metal powder or as a metal wire or band. The metal powder or metal wire may preferably be supplied to the electric arc burning in the pressure chamber through a bored electrode. The metal powder or the metal wire may be introduced into the electric arc also from the side. Further, the metal powder may preferably be blown into the electric arc by an auxiliary current of gas, and the metal vapour and the mixture of metal vapour and liquid metal may be led away by a funnel-shaped electrode in the wall of the pressure chamber. Very often it is advisable to place the metal powder, which is to be introduced into the electric arc, in the pressure chamber and to whirl it up by an auxiliary current of gas, preferably flowing in tangentially, and to introduce it into the leading-off electrode. The metal powder or wire used may preferably be metals fusing at a high temperature, more particularly, hard metals such as tungsten, zirconium, tantalum, or hard metal alloys or light metals, such as aluminium or light metal alloys, more particularly aluminium alloys such as aluminium-iron-chromium-alloys alone, or together with other metals fusing at a lower temperature, such as nickel, cobalt, chromium, iron steel.

Use may also be advantageously made of metal carbides, preferably hard metal carbides, such as tungsten-carbide, chromium-carbide, molybdenum-carbide, tantalum-carbide, niobium-carbide, vanadium-carbide, zirconium-carbide, titanium-carbide and hafnium-carbide, or metal-silicides, metal-borides, metal-nitrodes, or metal-phosphides, in conjunction with metals fusing at a lower temperature, such as metals of the iron group, copper group or zinc group, such as, preferably, iron, cobalt, nickel, rhodium, copper, zinc, cadmium, also antimony and bismuth, wherein the metal fusing at the lower temperature is liquefied or vaporized by the process, whilst the metal fusing at the high temperature, or the metal compound fusing at the high temperature, remains substantially in a solid form. The metal fusing at the lower temperature may, for instance, be supplied to the electric arc as a solid electrode, wire or band, whilst the metal or metal-compound fusing at a high temperature, such as metal-carbide, for instance tungsten-carbide, metal-silicide, metal-boride or metal-phosphide, is supplied in the form of powder. Naturally, both substances may be used in powder form, for instance in the form of a powder mixture. The pressure in the pressure chamber may be adjusted to a value higher than atmospheric pressure, preferably at a pressure over 5 atm. up to 100 atm.

The apparatus according to the invention has the advantage that, by the use of high pressure in the pressure chamber, the temperature of the electric arc and of the vaporising electrode can be considerably increased. In this way it is possible, according to the pressurue, to attain temperatures which lie substantially beyond the known temperature of the electric arc under normal conditions. Owing to the supplied auxiliary pressure means, the temperature can be chosen so high, that the mixture of metal vapour and gas that flows out is capable of transferring sufficient heat on to the article to be coated to enter into close union or form an alloy with the metal to be provided thereon. In this way 5 to 30 atm. may in some cases be sufficient; in other cases the pressure may be increased up to 100 or 200 atm. or more. By the increase in pressure in the vaporising chamber it is possible to vaporise substantial amounts of metals having a high fusing point, such as tungsten, chromium, molybdenum, tantalum, zirconium, hafnium and vanadium. The removal of the metal vapour, sometimes together with the fused metal, through the electrode provided with a bore, directly into the open, has the advantage that the vapour stream is an uninterrupted one, the outgoing gas assuming approximately the temperature of the electric arc.

By suitably cooling electrodes it is also possible to attain that mainly gas, for instance hydrogen or nitrogen, reaching the temperature of the electric arc, flows out, which gas only, owing to the extremely high temperature, can be used for welding. The material filling the welding seam is supplied in a known manner, as in the case of the normal gas welding.

One form of apparatus comprises a pressure chamber with a supply pipe for the pressure means and/device for the electric arc and metal vaporisation adjustably arranged therein together with the current leads, the one electrode of which provided with an opening is so arranged on the wall of the pressure chamber, which is also provided with an opening, that the electrode opening leads into the open. The device may include an electrode adjustably mounted on a guide rail and adjustable from the outside, e. g. by means of a hand-wheel. A cooling device may be provided for the electrode having the opening. If necessary, a cooling device may be provided also for the counter-electrode.

According to another form the apparatus comprises an electric arc pressure chamber having a removable bored electrode let into the wall for the removal of the material which has been agitated, and a device for the supply of the metal-powder or band or wire to the electric arc burning in the pressure chamber. The apparatus also comprises a bored electrode for the supply of the metal-powder or wire. When use is made of a metal wire or band the reel may be arranged movably in the pressure chamber itself, and the wire may be guided through a fitting. The leading off electrode may be preferably constructed in the form of a funnel and be nozzle-like. The apparatus further comprises a supply pipe tangentially connected to the pressure chamber for the supply of auxiliary gas for the agitation of the metal-powder which lies in the pressure chamber, or which is supplied by means of the auxiliary gas. The apparatus also comprises a container for charging an auxiliary gas current with the metal-powder, which container is preferably made cylindrical and is provided with an auxiliary gas supply pipe tangentially connected thereto.

Three forms of construction for carrying the invention into effect are illustrated diagrammatically, and by way of example, in the accompanying drawings, in which Figures 1, 2 and 3 are sections through three different apparatus for the production of metallic coatings from metals or alloys vaporised or fused in a chamber by means of an electric arc.

In Figure 1, 1 is the pressure chamber, which can be closed by a removable lid 2. On the lid there is provided a guiding rail 3 on which a holding device 4 for the one electrode, for instance the positive electrode 5, can be adjusted from the outside by a hand wheel 6 and by means of a shaft 7 carrying a screw spindle 8. 9 is a cooling device provided in the lid, 10 is a sealing member which is ground in, 11 is a pressing device for the sealing member and 12 is the current lead. In the wall of the pressure chamber 1 there is provided a supply pipe 13 for the auxiliary pressure means, as well as a conduit 15 closed by a window 14. 16 is a packing ring. The wall 17 of the pressure chamber opposite the lid 2 is provided with a central opening 18 and two lateral openings 19 and 20. An insertion or supporting member 21, which carries the other removable electrode 22 provided with a bore 23, is arranged in front of the central opening in the pressure chamber. 24 is a member abutting against the electrode, which is preferably made of material fusing at a high temperature, and is similarly provided with a bore. The electrode 22 is also made of a material fusing at a high temperature, for instance of metals such as tungsten or hard metal carbides or the like. Further, in the supporting member 21 there is provided a cooling device 25 for the electrode 22 and the member 24, the supply pipe 26 and outlet pipe 27 of which pass through the openings 19 and 20 respectively. The supporting member 21 is secured in a gas-tight manner on the wall of the pressure vessel through the interposition of a heat-resisting insulating layer 28. The fixing is effected, for instance, by means of a screw nut 29 and 30 respectively mounted on a screw thread formed on the cooling conduit 26 and 27, which screw nuts are pressed against the part 17 of the pressure chamber through the interposition of an insulating disc washer 31 and 32 respectively. The current is led away from the bored electrode, for instance through the cooling pipe 27 and the current lead 33. 34 is the electric arc and 35 is the vapour stream issuing from the bore of the electrode, for instance the negative electrode. 36 is the body to be treated.

In Figure 2, 37 is the pressure chamber, in one wall of which the removable bored electrode 38 is screwed on by means of a cover 39 provided with a central opening. The electrode is preferably made funnel-shape or nozzle-like, in order to ensure an easy removal of the fused or vaporised material to be whirled up. 40 is a counter-electrode provided with a bore 41, which, however, may also be made solid, and which is mounted in a sleeve 42 provided with a screw thread by which it is adjustably connected with the screw spindle 43, which may also be provided with a bore 44. A pressure gas alone, or together with metal-powder, may be supplied through the bore 44. The sleeve 42 is provided at the end with a guiding projection 45, which slides in a corresponding guiding groove 46 of the sealing stopper 47, which is insulated from the pressure chamber 37 by an insulating layer 48, for instance, of asbestos or another insulating material. The sealing stopper 47 is screwed into the pressure chamber 37 by means of the cover 49. The hand wheel 50, against which spring pressure is exerted, is used for the adjustment of the electrode 40 to which the current is supplied by the lead 51. 52 is a knob and 53 the current lead for the other electrode. 54 is the vessel serving for the reception of the metal-powder, which vessel is provided with a tangential auxiliary gas supply 55 and with a filling opening 56. By means of the two-way cock 57 the auxiliary gas current charged with the metal-powder may be blown into the pressure chamber, preferably tangentially, through the pipe 58, and be thereby supplied to the electric arc and to the funnel-shaped leading-off electrode laterally. However, the metal-powder may also be supplied through the pipe 59 to the other bored electrode and through its bore to the electric arc 34. At the mouth 60 of the pipe 58 there may be attached, as is indicated in dotted lines, a pipe 61, which allows the metal-powder to be led directly into the electrode funnel. Further, the metal-powder 62 may be deposited directly in the pressure chamber 37 and be whirled up by the auxiliary gas current entering the pressure chamber tangentially through the pipe 58 and be led to the electric arc, whilst the removal is effected through the bored funnel-shaped electrode 38. 63 is a pipe for the supply of a gas under pressure.

The apparatus according to Figure 3 differs from the apparatus shown in Figure 2 essentially only by the way the metal band or metal wire is fed, which band or wire is arranged in the pressure chamber, preferably in the form of a reel 64 adjustable from the outside, so that the wire 65 can be led to the electric arc 34 through a guide 66. The drive of the reel is effected, for instance, from the outside, by means of a driving shaft 67 through the intermediary of a bevel wheel gear 68. The shaft 67 may be connected in any desired manner, for instance through a flexible shaft 69, with a driving motor which is not shown. Further, the bored electrode 38 is arranged in an insulated manner in the wall of the pressure chamber 37 through a layer 70 and is connected with a current lead 71. The sealing stopper 72 is inserted in the pressure chamber in a non-insulated manner. However, the sealing stopper 72 may be inserted in an insulated manner through the intermediary of the insulation 73, shown in dotted lines, and in that case the bored electrode 38 is used without any insulation and without a current lead 71, the stopper 72 being then provided with a current lead 74, shown in dotted lines.

What we claim is:

1. An apparatus for producing metal coatings by the vaporisation of a metal in an electric arc comprising a pressure chamber, two electrodes lying opposite each other within the said chamber between which an electric arc can be formed and electric leads to the said electrodes, the pressure chamber having an opening for the admission of a gaseous pressure means into the chamber, and one of the said electrodes being mounted in the wall of the chamber and being hollow so as to form a passage leading from the interior of the chamber to the outside thereof, the pressure chamber being otherwise closed, whereby a pressure can be maintained therein and the metal vaporised leave the chamber together with the gaseous medium under the action of the latter through the said hollow electrode.

2. An apparatus as claimed in claim 1 having means outside the pressure chamber connected to one of the electrodes for moving it with respect to the other electrode, and means within the said chamber for guiding the movement of the electrode.

3. An apparatus as claimed in claim 1 and having cooling means in the chamber wall in which the hollow electrode is mounted.

4. An apparatus as claimed in claim 1 in which the chamber wall with the hollow electrode and a lid closing the pressure chamber and supporting the other electrode inside the chamber have cooling means.

5. An apparatus as claimed in claim 1 and in which the hollow electrode is fitted into the chamber wall without being fixed thereto, so that it is easily removable.

6. An apparatus as claimed in claim 1 and in which the electrode within the pressure chamber facing the hollow electrode in the chamber wall has a passage for the supply of metal to the space between the electrodes for the purpose of being vaporised.

7. An apparatus as claimed in claim 1 and having a supply of metal to be vaporised consisting of a length of wire, and further having a reel within the chamber on which the length of wire is wound, means for unwinding the said length of wire and means for guiding the free end of the wire towards the hollow electrode in the chamber wall, the said free end of the wire serving as the other electrode.

8. An apparatus as claimed in claim 1 and in which the passage in the hollow electrode first converges and then diverges in the direction from the inside to the outside of the pressure chamber.

9. An apparatus as claimed in claim 1 and in which the metal to be vaporised is in the from of powder placed within the chamber, further comprising a supply pipe tangentially connected to the chamber for the supply of a gas to agitate the said metal powder.

10. An apparatus as claimed in claim 1 and in which the metal to be vaporised is in the form of powder, further comprising a receptacle outside the chamber in which the said metal powder is contained, a pipe connection between the said receptacle and chamber which pipe is tangentially connected to the chamber and means for the admission of a gaseous medium into the said receptacle, whereby the latter takes the metal powder along with it and delivers it into the chamber through the said pipe connection.

RUDOLF REINECKE.
WILHELM BURKHARDT.